(Model.)
W. C. NYE.
COVER FOR POTS, &c.
No. 342,379. Patented May 25, 1886.
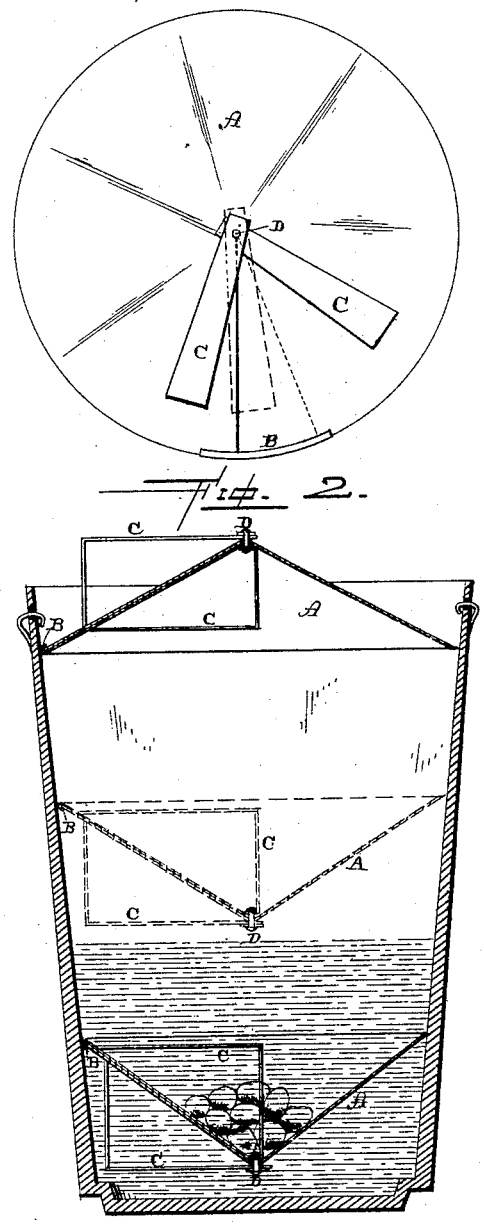
Witnesses.
L. F. Gardner
Jno. E. Prosperi
Inventor.
W. C. Nye.
per F. A. Lehmann,
Atty

United States Patent Office.

WILLIAM C. NYE, OF BRADFORD, PENNSYLVANIA.

COVER FOR POTS, &c.

SPECIFICATION forming part of Letters Patent No. 342,379, dated May 25, 1886.

Application filed June 26, 1885. Serial No. 169,906. (Model.)

*To all whom it may concern:*

Be it known that I, WILLIAM C. NYE, of Bradford, in the county of McKean and State of Pennsylvania, have invented certain new and useful Improvements in Covers for Pots and other Vessels; and I do hereby declare the following to be a full, clear, and exact description of the invention, such as will enable others skilled in the art to which it pertains to make and use it, reference being had to the accompanying drawings, which form part of this specification.

My invention relates to an improvement in covers for pots and other vessels; and it consists in an expansible cover, which is made from a single piece of material, and which has one of its edges turned up so as to form a holding device, and which is provided with a handle or handles for each of its ends, so that it can be quickly and readily adjusted to the required size, as will be more fully described hereinafter.

The object of my invention is to provide a cover for cooking-vessels, which is made adjustable in size, not only for the purpose of fitting different-sized vessels, but to enable the cover to be forced down in the vessel upon the top of the article being cooked, so that the water will rise above the edges of the cover, and thus allow the person to see whether the water is boiling or not, or whether there is a sufficient quantity in the vessel, without having to raise the cover, and to serve as a drain for the article being cooked, as well as a means for lifting the article out of the pot.

Figure 1 is a plan view of a cover embodying my invention. Fig. 2 is a side elevation of the same, showing two covers used together.

A represents the cover, which is made from a single sheet of material, and which has its two ends to overlap, as shown, for the purpose of holding the ends in any desired relation to each other. A flange, B, is formed upon the lower edge of the cover at one end, and this flange is turned up so as to catch over the edge of the other end, as shown. This flange serves not only to guide the movement of the ends in relation to each other, but also by frictional contact serves to hold the ends in any position to which they may be adjusted. Were it not for this flange the ends would spring apart when left free to move.

Each end of the cover has a handle or handles, C, secured to it, and which handles are pivoted at their inner ends upon a central rivet, D, and which have their outer ends bent downward or upward, and secured rigidly to the side of the cover, as shown. The handles on the end of the cover which is provided with the flange are placed farther from the edge than the ones upon the other end of the cover and for the purpose of allowing the ends to be made to overlap each other a distance proportioned to the extent to which the cover is to be reduced in diameter. If both of the handles were secured near the edges of the cover the cover could only be contracted very slightly. These handles being placed close together enable a person to expand and contract the cover in size with one hand.

This cover is intended to be made to fit tightly inside of a cooking-vessel at any desired distance above the article which is being cooked or to hold the article, as shown in Fig. 2.

If desired, the cover can be forced down at its lower edges below the surface of the water in the vessel, and thus enable a person to see at a glance whether the water is boiling, and whether there is a sufficient quantity in the vessel, without having to raise the cover to make an inspection.

A second cover may be used in connection with the upper one, and the second one forced down into the water and made to hold the article being cooked. After the article is cooked the lower cover may be raised above the top of the water and allowed to drain, and thus be kept hot by the steam.

A number of covers may be used in the same pot, each cover holding a separate substance.

The handles on the inner side of the cover will be brought into use only when the cover is used in an inverted position. The handles will preferably be applied to both sides of the cover.

Having thus described my invention, I claim—

An expansible cover formed from a disk which is open from its center to one side, and which has its ends to overlap each other, and provided with a handle upon each end, one of the ends being provided with a means for keeping the ends in contact with each other, substantially as shown.

In testimony whereof I affix my signature in presence of two witnesses.

WM. C. NYE.

Witnesses:
F. A. LEHMANN,
L. L. BURKET.